(No Model.) 3 Sheets—Sheet 1.
C. C. HILL.
SCREW MACHINE.
No. 522,207. Patented July 3, 1894.
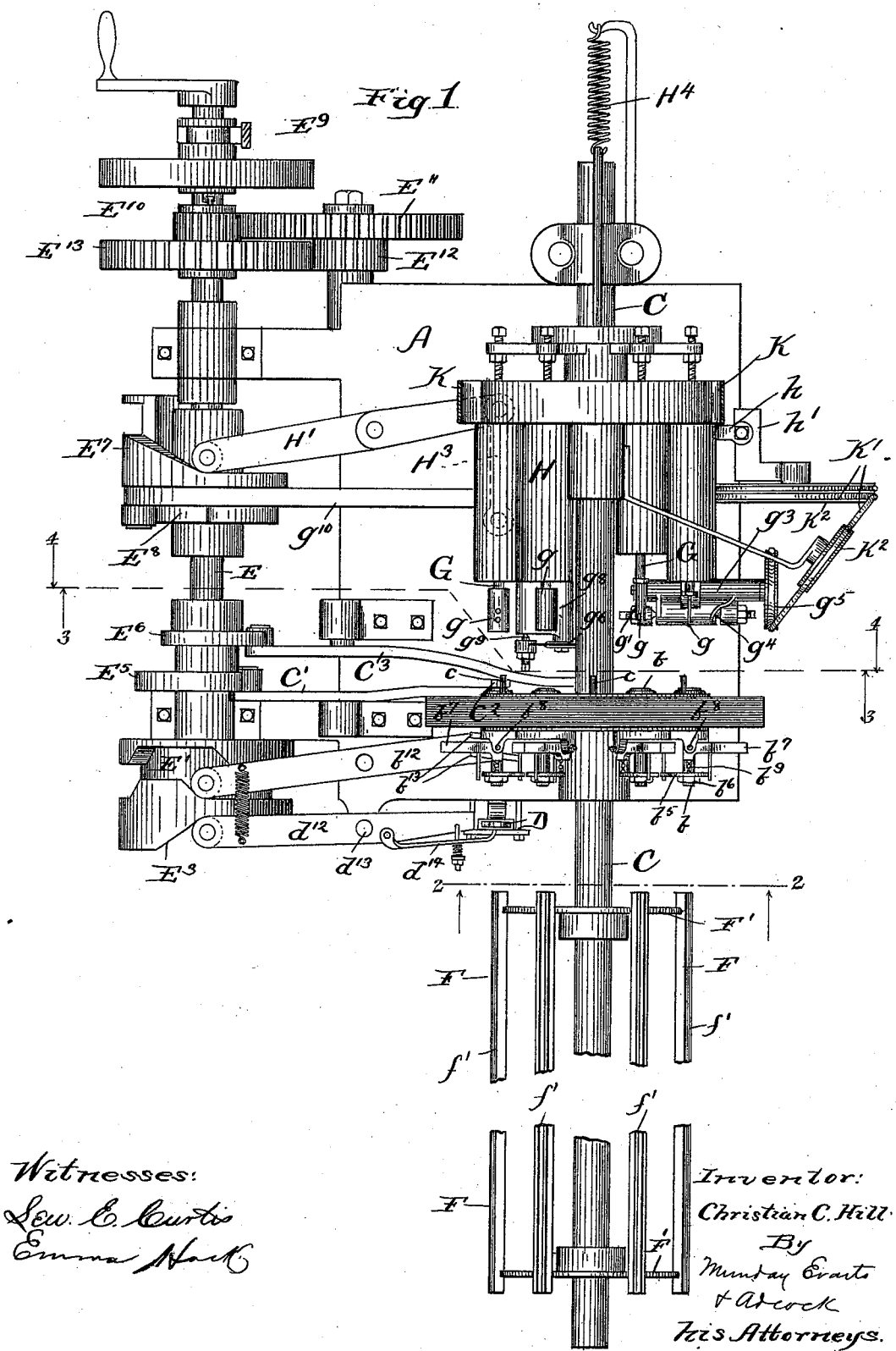
Witnesses:
Lew. E. Curtis
Emma Hack
Inventor:
Christian C. Hill
By
Munday Evarts
& Adcock
His Attorneys.

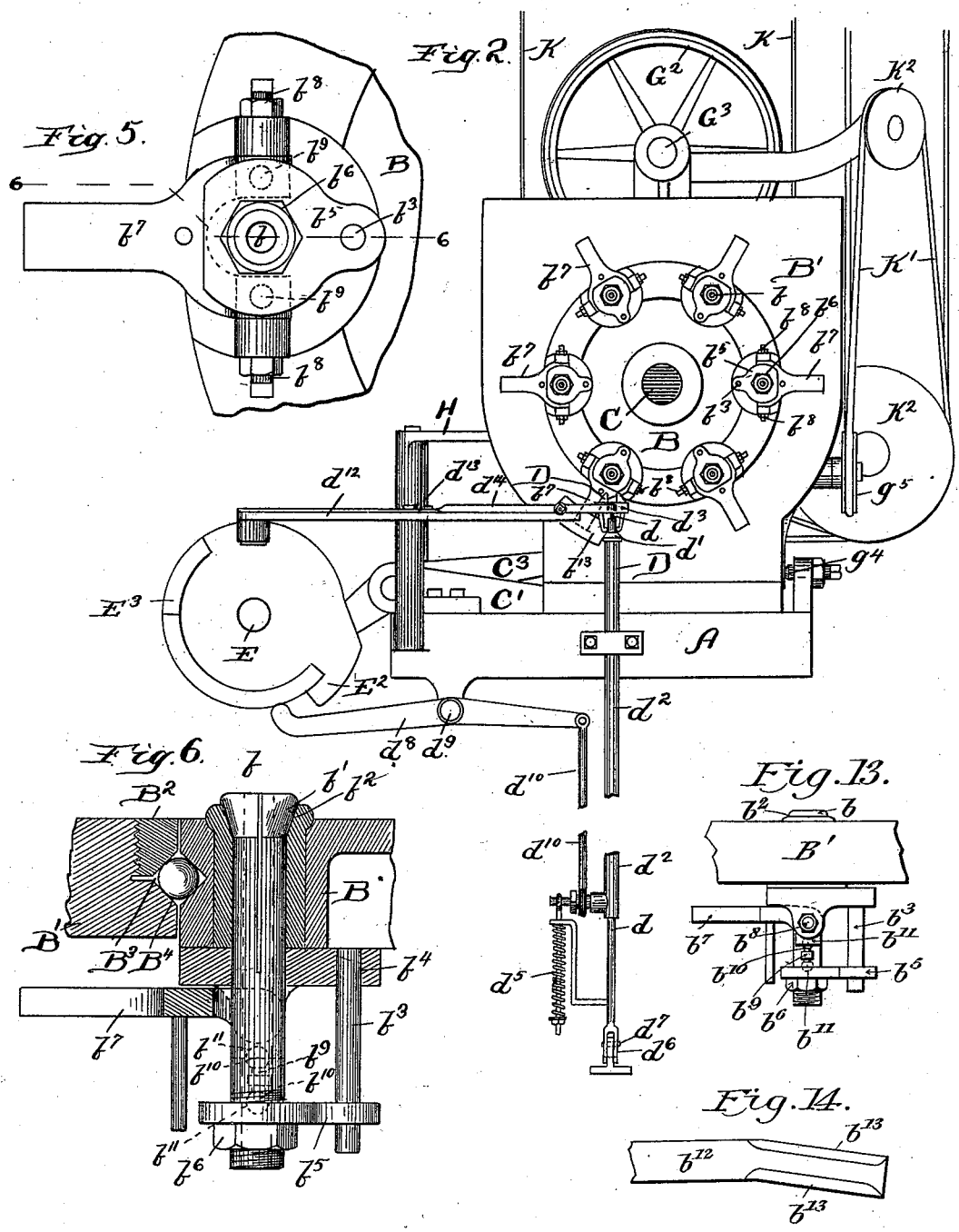

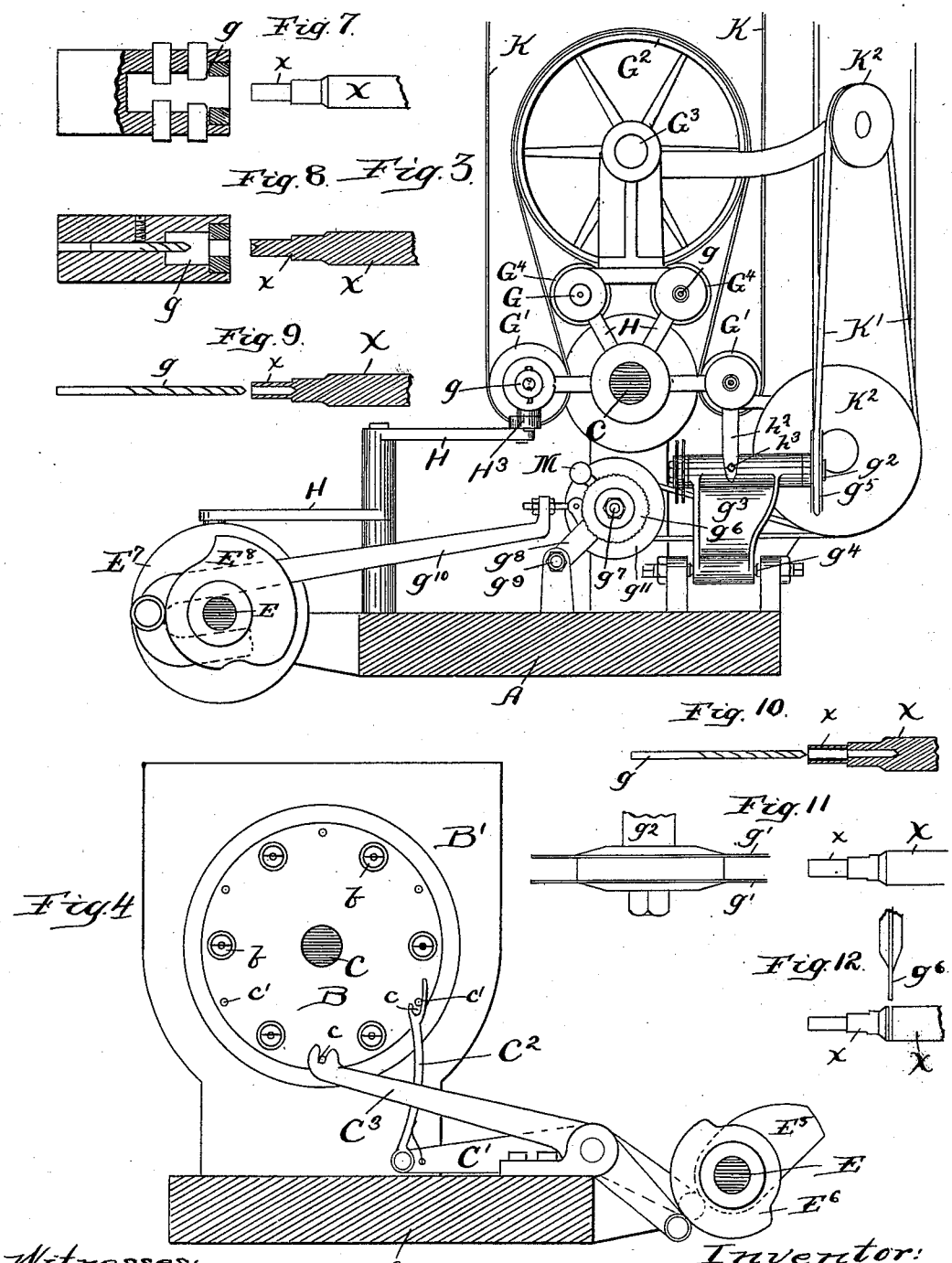

UNITED STATES PATENT OFFICE.

CHRISTIAN C. HILL, OF CHICAGO, ILLINOIS, ASSIGNOR TO THE HILL MACHINE COMPANY, OF SAME PLACE.

SCREW-MACHINE.

SPECIFICATION forming part of Letters Patent No. 522,207, dated July 3, 1894.

Application filed October 10, 1892. Serial No. 448,370. (No model.)

*To all whom it may concern:*

Be it known that I, CHRISTIAN C. HILL, a citizen of the United States, residing in Chicago, in the county of Cook and State of Illinois, have invented a new and useful Improvement in Screw-Machines, of which the following is a specification.

My invention relates to improvements in machines for making screws or other articles requiring a number or series of operations in their manufacture.

The object of my invention is to provide a simple and efficient machine for making metal screws and other like articles, and to so devise the machine that it may be cheaply constructed and easily operated and kept in order, and whereby at the same time the screws or other articles may be very rapidly manufactured.

To this end the machine embodying my invention comprises a reciprocating tool carrying carriage furnished with a series of axially rotating spindles for revolving or operating the several tools, one for each tool, combined with an intermittently revolving rod holder for holding the several pieces of stock being operated upon by the several tools, and an intermittently revolving chuck head furnished with a corresponding series or number of chucks for clamping or chucking the rods, and a single feed device which co-acts with the intermittently revolving rod holder and the series of chucks to feed each rod forward in turn as it is brought around in position to be acted upon by the feed device. By combining an intermittently revolving rod holder, and a correspondingly revolving chuck head furnished with a series of chucks, with a single feed device and a reciprocating tool carriage furnished with a series of axially revolving spindles or moving tools so that the chucks need have no axial or rotary movement, the construction and operation of the machine are very greatly simplified while at the same time the capacity of the mechanism is very greatly increased as not only are all the tools adapted to be in operation at once, but each and all the tools are adapted to be run or driven at the proper and most economical speed for the particular work of each. Where, as heretofore, the work has been done by imparting to the rods and the chucks for holding the same an axial rotation, while the different tools of the set remain stationary or non-rotary, the capacity of the machine is necessarily limited to the speed at which it is practicable to revolve the rods; and where the rods are of any considerable length the practical speed for revolving them is comparatively small. In my machine as the rods and the chucks for holding them have no axial rotation, the speed or capacity of the machine is only limited by the speed at which it is practical to revolve the several tools and this is ordinarily several times the speed at which it would be practicable to revolve the rods and the chucks for holding the same. For example, in my machine in practice as I am now using the same, I revolve the tools at a speed of from two thousand to three thousand or three thousand five hundred revolutions per minute; whereas the practical speed for revolving the rods and chucks for holding the rods in machines of the old style for doing similar work would be not to exceed five hundred or six hundred revolutions per minute, as I am informed. In my machine also as the rods and chucks for holding the rods have no axial rotation I am enabled in the same machine to combine with the axially revolving tools, other tools which have no axial rotation, such for example as tools designed to flatten the sides of the article, and thus perform operations that could not be performed by machines which have axially revolving chucks and revolve the rods and the articles being made.

My invention further consists in the novel devices and novel combinations of parts and devices herein shown and described and more particularly pointed out in the claims.

In the accompanying drawings which form a part of this specification, Figure 1 is a plan view of a machine embodying my invention. Fig. 2 is an end view looking from the line 2—2 on Fig. 1 in the direction indicated by the arrow. Fig. 3 is a section taken on the broken line 3—3 and looking in the direction of the arrow marked 3. Fig. 4 is a section taken on the same line looking in the direction of the arrow marked 4. Fig. 5 is an enlarged detail view of one of the chucks showing the chuck and the lever for opening and closing it. Fig. 6 is a section through one of the chucks taken on the line 6—6 of Fig. 5. Figs. 7, 8, 9, 10, 11, and 12 are detail views showing the six different forms of tools with which the machine illustrated may be provided and indicating the work done by each of these tools. The set of tools illustrated are designed to produce a particular kind of article commonly known as a bicycle spoke nipple. The machine may however be furnished with any kind of tools designed for performing different operations as may be required in making different articles. Fig. 13 is a detail view showing the toggle lever and link mechanism for closing and holding closed the chuck, and Fig. 14 is a detail view of the horizontally vibrating lever and mechanism for opening the chuck to permit the forward feed of the rod and then to close the chuck and clamp the rod as the intermittently rotating chuck head or carrier revolves.

In the drawings A represents the frame of the machine.

B is an intermittently revolving head secured to the shaft C and which is furnished with a series of chucks $b$ for clamping or chucking the rods X from which the articles $x$ are to be formed. The number of chucks $b$ on the intermittently revolving head B should correspond to the number of operations desired to be performed to produce the particular article being made by the machine. As illustrated in the drawings the number of chucks is six, but this number may be diminished or increased as desired, and if the machine has more chucks than required one or more of them may be left vacant or unused without interfering with the operation of the machine.

The intermittently revolving chuck head B is supported or journaled in ball-bearing rings $B'$ $B^2$ on the frame, the same being furnished with a ball bearing groove or channel $B^3$ in which the balls $B^4$ fit. The chucks $b$ are or may be of any ordinary construction, and have the usual cones $b'$ $b^2$ to close the chuck upon the rod. The chucks $b$ each have a guide pin $b^3$ which fits in a suitable hole or guide $b^4$ in the head B and which is secured to the chuck $b$ by a bracket $b^5$ and nut $b^6$. The chucks are opened and closed by means of a lever $b^7$ pivoted by a pin $b^8$ to the head B, and which is connected by a toggle link $b^9$ interposed between the lever $b^7$ and the bracket or arm $b^5$ on the chuck. The link $b^9$ has ball shaped heads $b^{10}$ which fit in corresponding sockets $b^{11}$ in the lever $b^7$ and arm $b^5$. The chuck is held closed when the connecting link or toggle pin $b^9$ is at the dead center as indicated in Fig. 6. To open the chuck the bent lever $b^7$ is moved so as to throw the three pivots $b^8$ and $b^{10}$ $b^{10}$ out of a straight line, thus giving a slight movement to the chuck $b$ and disengaging the cones $b'$ $b^2$ sufficiently to permit the spring jaws of the chuck $b$ to open. The levers $b^7$ are moved to open the chuck to permit the stock to be fed at intervals and again to close the chuck to clamp the stock by means of a flanged or forked lever $b^{12}$ between the flanges or forks $b^{13}$ of which the end of the lever $b^7$ is brought by the revolution of the chuck head B. This lever $b^{12}$ is moved to open and close the chuck by means of a cam $E'$ on the cam shaft E.

The stock or rod X is fed forward at intervals by means of a feed device D, consisting, preferably, of a pair of opening and closing jaws adapted to be moved astride the rod, to close upon the rod, and then to push the rod longitudinally forward. Any other suitable feed device known to those skilled in the art may however be substituted in place of these opening and closing movable jaws D D. The jaws D D are preferably moved astride the rod by means of a reciprocating bar $d$ to which they are pivoted and they are preferably closed upon the rod by means of a cone or cam $d'$ on a reciprocating sleeve $d^2$ surrounding the bar $d$. The feeder jaws D are pivoted at $d^3$ to the bar $d$. The rod or bar $d$ which carries the grippers or jaws D is preferably mounted loosely in the sleeve $d^2$ and supported therein on a spring $d^5$ so that it may stop after it comes in contact with the rod and permit the sleeve $d^2$ to be carried up slightly farther to close the jaws. This enables the rod $d$ and the sleeve $d^2$ to be both operated by one and the same lever or operating mechanism. The rod $d$ is pivoted at $d^7$ to the frame, the pivot $d^7$ passing through a slot in the lugs $d^6$ to enable the rod $d$ to have the requisite up and down movement. The rod $d$ is thus pivoted so that the sleeve $d^2$ may have a swinging movement on this pivot $d^7$ sufficient to permit the feed-jaws D D to move forward the requisite distance for feeding the stock. The sleeve $d^2$ is lifted at intervals to bring the feed jaws D D astride the rod, and then further to close said jaws upon the rod by means of a cam $E^2$ on the shaft E which operates a lever $d^8$ pivoted at $d^9$ to the frame and which is connected by a link $d^{10}$ with the sleeve $d^2$ or a projection thereon. The jaws D D are given their forward movement in the direction of the rod X to feed the same forward by means of a cam $E^3$ on the shaft E which engages a lever $d^{12}$ pivoted at $d^{13}$ to the frame. This lever $d^{12}$ is furnished with a spring arm $d^{14}$ which directly engages the jaws D to push the same forward so that the spring may yield after the end of the stock is fed against the stop or gage on the cutting off tool carriage or arm, which stop serves to limit the feed.

F is an intermittently revolving rod holder having a series of rod holding grooves or receptacles $f$ corresponding in number to the chucks $b$ on the head B. This rod holder consists preferably of slats $f'$ mounted on spiders $F'$ secured to the shaft C, the rod holder slats $f'$ extending parallel to this shaft and being intermittently revolved by the shaft. The shaft C carrying the chuck head B and rod holder spiders $F'$ is or may be intermittently revolved to bring the chucks in turn in position for co-operation with the single lever or mechanism for opening and closing the chucks and into position for co-operation with the single feed device for the series of rods X in turn by any suitable means or mechanism known to those skilled in the art for producing or communicating an intermittent rotary motion. The means or mechanism however which I prefer to employ for this purpose consists of a pair of cams $E^5$ $E^6$ on the cam shaft E which operate a pawl lever C' carrying a pivoted pawl $C^2$ and a locking lever $C^3$, the pawl $C^2$ and locking lever $C^3$ having notches c which engage the pins or projections c' on the chuck head B.

H is a reciprocating tool carriage mounted upon and adapted to slide back and forth on the shaft C, the same being held however from revolving with the shaft by a sliding arm h which engages a guide h' on the frame of the machine. This reciprocating tool carriage H is furnished with a series of revolving tool holder spindles G by which the tools g are held and revolved or operated. The carriage H is reciprocated back and forth to bring the tools up into position for operation on the several rods H, by means of a cam $E^7$ on the shaft which operates a lever H' connected with said carriage H by a pivoted link $H^3$. A spring $H^4$ attached to the frame serves in part to withdraw the carriage or hold it in position. The tool carrying and revolving spindles G on the head H are driven from a countershaft or other source of power in the building where the machine is located by means of a belt K, which passes around pulleys G' G' on two of said spindles and thence around a pulley $G^2$ on the shaft $G^3$, and which wheel $G^2$ is in frictional contact with the wheels $G^4$ on the two remaining spindles.

In the machine illustrated in the drawings I have mounted four spindles G on the tool carriage, but any greater or less number of spindles may be employed on the carriage that is desired. The tool g carried by the four spindles G on the tool carriage performs the four operations indicated in Figs. 7, 8, 9 and 10, Fig. 8 showing the centering tool, Fig. 7 the shaping tool, Fig. 9 a boring tool and Fig. 10 a further boring tool. Two additional operations are automatically performed by the machine, that illustrated in Fig. 11 being to flatten the sides of the nipple x, and that illustrated in Fig. 12 to cut the nipple from the rod. The flattening tool consists preferably of a pair of revolving saws g' g' carried by a transverse spindle or shaft $g^2$ which is mounted upon a swinging arm $g^3$ pivoted at $g^4$ to the frame of the machine and which is moved back and forth at intervals by the reciprocating movement of the tool carriage H. I mount this flattening tool g' g' on an arm or carriage separate from the tool carriage so as to relieve the tool carriage from the tension of the belt K' by which this tool is driven. The belt K' passes around a pulley $g^5$ on the saw shaft $g^2$. The swinging arm or tool holder $g^3$ is moved back and forth by the carriage H by means of a bracket $h^2$ thereon furnished with a set screw $h^3$ which engages the arm $g^3$ on one side while the bracket engages it on the other. The cutting off tool $g^6$ preferably consists of a saw secured to the shaft or spindle $g^7$ mounted on a swinging arm or lever $g^8$ pivoted at $g^9$ to the frame of the machine and which is operated by a cam $E^8$ on the cam shaft E through the connecting link, $g^{10}$. The stop or gage M against which the end of the rod X engages when it is fed forward and which serves to limit the forward feed of the rod by the feed mechanism is preferably mounted upon the swinging arm or holder $g^8$ which carries the cutting off tool $g^6$. The cam shaft E is furnished with a driving pulley $E^9$.

$E^{10}$ $E^{11}$ $E^{12}$ $E^{13}$ are reducing gears for diminishing the speed of the cam shaft E from that of the driving pulley $E^9$.

The cutting off tool $g^6$ or its shaft $g^7$ is driven by the belt K' which passes around a pulley $g^{11}$ on said shaft $g^7$, and also around the intermediate pulleys $K^2$ $K^2$.

The operation of my machine is as follows: The rod holder F and the chuck head C rotate intermittently or by a step by step movement. At each step or part turn of the rod holder and chuck head the series of operations are performed by the series of tools upon the series of rods carried by the rod holder and held by the series of chucks, thus finishing one article at each step or movement. At each stop of the intermittently revolving rod holder F and chuck head C, the vibrating lever $b^{12}$ opens and closes the chuck, and also the rod feed device D swings astride the rod, closes upon it and feeds the rod forward against the gage or stop M which limits and regulates accurately the feed. The chuck operating lever $b^{12}$ closes the chuck so as to firmly grasp the rod before the jaws D release it, and the jaws D close upon the rod before the chuck opens to release the rod. The rod is thus always held firmly either by the chuck or by the feed jaws D. At this same station the saw or cutting off device $g^6$ severs the completed article from the rod. The rod holder F and the chuck head C then rotate one step, thus bringing the fresh rod opposite the shaping tool shown in Fig. 7. The reciprocating tool carriage H then moves forward, thus causing the axially rotating shaping tool to do its work. The chuck head C and rod holder F, after the tool carriage H has receded, then rotate another step bringing the rod in question opposite the centering tool, shown in Fig. 8, and the tool carriage H again advances, causing the centering tool to perform the operation indicated in Fig. 8. The reciprocating tool carriage H then recedes and the rod holder F and chuck head rotate another step, thus bringing the rod in question opposite the boring tool shown in Fig. 9, and the tool carriage H again advances causing the tool shown in Fig. 9 to perform the operation indicated in this figure. The next step brings the rod in question opposite the tool shown in Fig. 10, and the operation indicated in this figure is performed in like manner. The next step brings the rod in question opposite the flattening tool shown in Fig. 11 which then swings forward and performs the operation indicated in this figure. The next step or turn of the rod holder F and chuck head C brings the rod in question opposite the cut off tool $g^6$ which then moves transversely forward and performs the operation first described. At each step or turn of the rod holder F and chuck head C the chuck head is locked in accurate register with the several tools by the locking lever $C^3$.

I claim—

1. In a screw machine the combination of a reciprocating tool carriage furnished with a series of axially rotating tool holder spindles for revolving or operating the several tools with an intermittently revolving chuck head furnished with a series of non-rotating chucks for clamping or chucking the rods, substantially as specified.

2. In a screw machine the combination of a reciprocating tool carriage furnished with a series of axially rotating tool holder spindles for revolving or operating the several tools, with an intermittently revolving chuck head furnished with a series of non-rotating chucks for clamping or chucking the rods, and a rod feed device coacting with said intermittently revolving chuck head to feed each rod forward in turn, substantially as specified.

3. In a screw machine the combination of a reciprocating tool carriage furnished with a series of axially rotating tool holding spindles for revolving or operating several tools, with an intermittently revolving chuck head furnished with a series of non-rotating chucks for clamping or chucking the rods, and an intermittently revolving rod holder, substantially as specified.

4. In a screw machine the combination of a reciprocating tool carriage furnished with a series of axially rotating tool holding spindles for revolving or operating several tools, with an intermittently revolving chuck head furnished with a series of non-rotating chucks for clamping or chucking the rods, and a device for operating each chuck in turn to open and close the same as it is brought around in position by said intermittently revolving chuck head, substantially as specified.

5. In a screw machine the combination with a reciprocating tool carriage furnished with a series of axially rotating tool carrying spindles for revolving or operating the several tools, an intermittently revolving rod holder, an intermittently revolving chuck head furnished with a series of non-rotating chucks and means for holding the chucks closed as said head revolves, a device for operating each chuck in turn to open and close the same as it is brought around in position by said revolving chuck head and a rod feed device operating to feed each rod forward in turn as it is carried around by said rod holder, substantially as specified.

6. In a screw machine the combination with a reciprocating tool carriage furnished with a series of axially rotating tool carrying spindles for revolving or operating the several tools, an intermittently revolving rod holder, an intermittently revolving chuck head furnished with a series of non-rotating chucks and means for holding the chucks closed as said head revolves, a device for operating each chuck in turn to open and close the same as it is brought around in position by said revolving chuck head and a rod feed device operating to feed each rod forward in turn as it is carried around by said rod holder, and a stop or gage device to limit the forward feed of the rod, substantially as specified.

7. The combination with shaft C of intermittently revolving rod holder F and intermittently revolving chuck head B furnished with a series of non-rotating chucks $b$ and carried by said shaft C and a reciprocating tool carriage H mounted to slide back and forth on said shaft C and provided with a series of revolving tool carrying spindles G furnished with pulleys and a band for communicating motion to said pulleys and spindles on said reciprocating carriage H, substantially as specified.

8. The combination with an intermittently revolving chuck head B furnished with a series of non-rotating chucks $b$ each having a toggle lever and link $b^7$ $b^9$ operating to hold said chucks closed as the head B revolves, substantially as specified.

9. The combination with an intermittently revolving chuck head B furnished with a series of non-rotating chucks $b$ each having a toggle lever and link $b^7$ $b^9$ operating to hold said chucks closed as the head B revolves, and means for operating said toggle lever $b^7$ to open and close each jaw at intervals as the head B revolves, substantially as specified.

10. The combination with an intermittently revolving chuck head B furnished with a series of chucks $b$ each having a toggle lever and link $b^7$ $b^9$ operating to hold said chucks closed as the head B revolves, and a forked lever $b^{12}$ and cam $E^3$ for operating said lever $b^7$ in turn, substantially as specified.

11. The combination with an intermittently revolving chuck head B furnished with a series of non-rotating chucks $b$ and an intermittently revolving rod holder adapted to hold a number of rods of a rod feed device operating in conjunction therewith to feed each rod forward in turn at intervals as the holder and chuck head revolve, and means for actuating said rod feed device to feed each rod forward in turn automatically, substantially as specified.

12. The combination with an intermittently revolving chuck head B furnished with a series of non-rotating chucks $b$ and an intermittently revolving rod holder adapted to hold a number of rods, of a rod feed device operating in conjunction therewith to feed each rod forward in turn at intervals as the holder and chuck head revolve, said rod feed device having a pair of opening and closing jaws, and means for giving said opening and closing jaws two movements one in the direction of the rod and another to bring them astride the rod, substantially as specified.

13. The combination with the intermittently revolving chuck head furnished with a series of non-rotating chucks $b$, of rod feed device jaws D D carried by a reciprocating swinging bar $d$ which serves to bring the jaws astride the rod to be gripped and to move the jaws forward with the rod, substantially as specified.

14. The combination with the intermittently revolving chuck head furnished with a series of non-rotating chucks $b$ of rod feed device or jaws D D carried by reciprocating swinging rod $d$ which serves to bring the jaws astride the rod to be gripped and to move the jaws forward with the rod, and a sleeve $d^2$ for closing said jaws D D, substantially as specified.

15. The combination with intermittently revolving head B furnished with chucks $b$ of rod feed jaws D D mounted upon a reciprocating bar $d$, a sleeve $d^2$ furnished with a cone or wedge for closing said jaws, said bar $d$ having a pivotal and slotted connection with the frame at one end to permit the same to be reciprocated and to move the jaws D D forward in the direction of the rod to be fed, a cam and lever for actuating said rod $d$ and sleeve $d^2$, and a cam and lever for moving or swinging the jaws forward in the direction the rod is to be fed, substantially as specified.

16. The combination with intermittently revolving head B furnished with chucks $b$ of rod feed jaws D D mounted upon a reciprocating bar $d$, a sleeve $d^2$ furnished with a cone or wedge for closing said jaws, said bar $d$ having a pivotal and slotted connection with the frame at one end to permit the same to be reciprocated and to move the jaws D D forward in the direction of the rod to be fed, a cam and lever for actuating said rod $d$ and sleeve $d^2$, and a cam and lever for moving or swinging the jaws forward in the direction the rod is to be fed, and a spring $d^5$, substantially as specified.

17. The combination with intermittently revolving head B furnished with non-rotating chucks $b$ of rod feed jaws D D mounted upon a reciprocating bar $d$, a sleeve $d^2$ furnished with a cone or wedge for closing said jaws, said bar $d$ having a pivotal and slotted connection with the frame at one end to permit the same to be reciprocated and to move the jaws D D forward in the direction of the rod to be fed, a cam and lever for moving or swinging the jaws forward in the direction the rod is to be fed, said last mentioned lever having a spring $d^{14}$, substantially as specified.

18. The combination with an intermittently revolving chuck head B furnished with a series of non-rotating chucks $b$ of a reciprocating tool carriage H furnished with a series of axially revolving tool holding spindles G and a supplemental tool carrying arm or holder $g^3$ pivoted to the frame and operated by the movement of said tool carriage G, substantially as specified.

19. The combination with an intermittently revolving chuck head B furnished with a series of chucks $b$ of a reciprocating tool carriage H furnished with a series of axially revolving tool holding spindles G and a supplemental tool carrying arm or holder $g^3$ pivoted to the frame and operated by the movement of said tool carriage, said supplemental tool holder $g^3$ being furnished with a pair of saws $g'$ $g'$ for flattening the sides of the articles, substantially as specified.

20. The combination with an intermittently revolving chuck head B furnished with a series of non-rotating chucks of a reciprocating tool carriage H furnished with a series of axially revolving tool carrying spindles G, of a cut off tool mounted on a separate holder or pivoted arm, and a cam and connecting mechanism for operating said last mentioned tool holder, substantially as specified.

21. The combination with an intermittently revolving chuck head B furnished with a series of chucks $b$, of a reciprocating tool carriage H furnished with a series of axially revolving tool carrying spindles G of a cut off tool mounted on a separate swinging frame provided with a stop or gage M to limit the forward feed of the rods, and a rod feed device for feeding each rod forward in turn, substantially as specified.

22. The combination with a revolving chuck head B furnished with a series of chucks $b$, each having a toggle lever $b^7$ and toggle link $b^9$ for opening and closing said chucks and holding the same closed as the head B revolves, each of said toggle levers $b^7$ projecting outwardly and radially from the axis of said revolving head B, and an operating lever $b^{12}$ mounted on the frame of the machine externally of said chuck head B and into engagement with which said toggle levers $b^7$ are brought in turn by the revolution of said chuck head, substantially as specified.

23. The combination with a revolving chuck head B furnished with a series of chucks $b$, each having a toggle lever $b^7$ and toggle link $b^9$ for operating said chucks and holding the same closed, and operating mechanism external to the chuck head and into engagement with which said toggle levers are brought by the revolution of the chuck head, substantially as specified.

24. The combination with an intermittently revolving rod holder adapted to hold a number of rods, of a revolving chuck head B furnished with a series of chucks $b$, each having a toggle link $b^9$ and a radial outwardly projecting toggle lever $b^7$ for opening and closing and holding closed said chucks, an operating lever or device on the frame of the machine and external to said chuck head into engagement with which said toggle levers are brought in turn by the revolution of the chuck head, and a rod feed device operating to feed each rod forward in turn at intervals, substantially as specified.

25. The combination with an intermittently revolving rod holder adapted to hold a number of rods, of a revolving chuck head B furnished with a series of chucks $b$, each having a toggle link $b^9$ and a radial outwardly projecting toggle lever $b^7$ for opening and closing and holding closed said chucks, an operating lever or device on the frame of the machine and external to said chuck head into engagement with which said toggle levers are brought in turn by the revolution of the chuck head, and a rod feed device operating to feed each rod forward in turn at intervals, said rod feed device having a pair of opening and closing jaws and means for giving said opening and closing jaws two movements, one in the direction of the rods and another radially toward the center or axis of the chuck head and rod holder to bring said jaws astride the rod, substantially as specified.

26. The combination with an intermittently revolving chuck head B furnished with a series of chucks $b$, of opening and closing rod feed jaws D D carried by a longitudinal reciprocating and swinging bar $d$ and mechanism adapted to reciprocate said bar toward the rod to be fed and for vibrating it back and forth in the direction of the rod to be fed, whereby said jaws are first brought astride the rod and then the rod moved forward, substantially as specified.

27. The combination with an intermittently revolving chuck head B furnished with a series of chucks $b$, of rod feed jaws D D mounted upon a longitudinal reciprocating and swinging bar $d$ extending radially to said chuck head, the reciprocating movement of said bar $d$ serving to bring said jaws astride the rod, and the vibrating movement of said rod $d$ serving to move the jaws forward with the rod, and a sleeve $d^2$ for closing said jaws D D upon the rod, substantially as specified.

28. The combination with an intermittently revolving chuck head B furnished with a series of non-rotary chucks $b$, of a reciprocating tool carriage H furnished with a series of axially revolving tool holding spindles G, and a supplemental tool holder $g^3$ having no axial rotation in respect to the axis of the chuck, substantially as specified.

29. The combination with frame A of a reciprocating tool carriage H having a series of axially rotating tool holders, of shaft C, revolving chuck head B secured to said shaft and furnished with a series of chucks $b$, said head B having a peripheral bearing in said frame, substantially as specified.

30. The combination with frame A of a reciprocating tool carriage H, having a series of axially rotating tool holders of shaft C, revolving chuck head B secured to said shaft and furnished with a series of chucks $b$, said head B having a peripheral bearing in said frame, said head B and frame A having a ball bearing one upon the other, substantially as specified.

31. The combination with a chuck $b$ having the cones and wedges $b'$ $b^2$ for closing the same, of a toggle lever $b^7$ and toggle link $b^9$, arm $b^5$ and guide pin $b^3$, substantially as specified.

32. The combination with a chuck head B of a series of chucks $b$ mounted thereon, each having the cones or wedges $b'$ $b^2$ for closing the same, toggle lever $b^7$ and toggle link $b^9$, said toggle lever $b^7$ projecting outward and radially from the axes of said chuck head, substantially as specified.

Dated at Chicago, October 6, 1892.

CHRISTIAN C. HILL.

Witnesses:
EMMA HACK,
LEW. E. CURTIS.